(12) United States Patent
Cameron et al.

(10) Patent No.: US 8,522,165 B2
(45) Date of Patent: Aug. 27, 2013

(54) USER INTERFACE AND METHOD FOR OBJECT MANAGEMENT

(75) Inventors: Stefan Cameron, Orleans (CA); Alexander Di Nardo, Ottawa (CA)

(73) Assignee: Adobe Systems Incorporated, San Jose, CA (US)

(*) Notice: Subject to any disclaimer, the term of this patent is extended or adjusted under 35 U.S.C. 154(b) by 56 days.

(21) Appl. No.: 12/818,775

(22) Filed: Jun. 18, 2010

(65) Prior Publication Data

US 2011/0314422 A1    Dec. 22, 2011

(51) Int. Cl.
  *G06F 3/048*    (2006.01)
(52) U.S. Cl.
  USPC ............................ 715/835; 715/802; 715/811
(58) Field of Classification Search
  USPC .......................................... 715/835, 802, 811
  See application file for complete search history.

(56) References Cited

U.S. PATENT DOCUMENTS

| | | | |
|---|---|---|---|
| 7,296,242 B2* | 11/2007 | Agata et al. ................... | 715/793 |
| 2002/0033848 A1* | 3/2002 | Sciammarella et al. ...... | 345/838 |
| 2004/0150657 A1* | 8/2004 | Wittenburg et al. .......... | 345/619 |
| 2006/0031776 A1* | 2/2006 | Glein et al. ................... | 715/779 |
| 2006/0161868 A1* | 7/2006 | Van Dok et al. ............. | 715/835 |
| 2007/0067738 A1* | 3/2007 | Flynt et al. ................... | 715/810 |
| 2008/0066016 A1* | 3/2008 | Dowdy et al. ................ | 715/854 |
| 2008/0307303 A1* | 12/2008 | Louch et al. .................. | 715/273 |
| 2008/0307309 A1* | 12/2008 | Marinkovich et al. ........ | 715/723 |
| 2008/0307343 A1* | 12/2008 | Robert et al. ................. | 715/765 |
| 2008/0307364 A1* | 12/2008 | Chaudhri et al. ............. | 715/836 |

OTHER PUBLICATIONS

Dan Frakes, Macworld.com New document here Mar. 28, 2005 6 pages.*
Hints and Tips Advanced Task Scheduler Online manual Aug. 23, 2006 2 pages.*
Becky Atwood FirstClass Calendar Dec. 4, 2009 11 pages.*

* cited by examiner

*Primary Examiner* — William Bashore
*Assistant Examiner* — Andrea Long
(74) *Attorney, Agent, or Firm* — Kilpatrick Townsend & Stockton LLP

(57) ABSTRACT

A computing device includes a processor executing instructions to provide a graphical user interface displayed on a display device and for facilitating navigation through a collection of files stored in a storage device, the user interface including a primary icon displayed on the display device and representing a selected file, a temporal axis defined across at least a portion of the primary icon, and one or more secondary icons displayed on the display device, each representing a respective additional file, the secondary icons being positioned separate from the primary icon, wherein the secondary icons are arranged along the temporal axis in temporal order of each additional file represented by the secondary icons.

27 Claims, 5 Drawing Sheets

USER INTERFACE AND METHOD FOR OBJECT MANAGEMENT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Various User Interfaces ("UIs") are known for managing and manipulating documents and other objects on computing devices. One type of UI displays a list of Most Recently Used ("MRU") objects. For example, word processors often display a list of most recently used documents and operating systems often display a list of most recently used applications. Displaying such a list allows expedited access to recently used objects. Users may simply navigate a menu rather than, for example, a series of dialogue boxes to navigate through a file path. Such a list may display, for instance, the ten most recently used objects. Typically, this list is displayed as a text based menu item at the bottom of the application's top-level File menu or from an "Open Recent>" fly-out menu under the top-level File menu. While this UI may be convenient for a user accustomed to looking in the top-level File menu for MRU files, it does not lend itself well to a task-based UI.

A task-based UI makes tasks, not files and folders, the primary unit of interaction. Instead of showing entire hierarchies of information, such as a trees of files or file paths, a task-based UI typically displays icons with task-oriented phrases or images related to the task-at-hand, for example "Make New Drawing", "Open Existing Drawing" or "Organize Pictures". A task-based UI tends to be user friendly because users tend to use applications to accomplish tasks. These tasks are configured to be in line with what a user might be thinking at the moment they launch an application. In other words, users tend to think in terms of tasks that they want to accomplish as opposed to documents. Therefore, task-based UIs have become popular.

This task-based approach is convenient for an application that deals with a single type of file. For example, "Cover Flow", the animated UI integrated with many APPLE COMPUTERS, INC.™ products, displays icons to a user representing both the task of playing, i.e., rendering, a media file and the underlying media file. This UI works well when there is only one task to be accomplished, rendering in this example. However, the convenience of this approach wanes when an application allows a user to perform multiple tasks or author multiple types of files or documents. Such an application may include multiple modules of varying types, for example a text module to create document objects, an image module to create image objects, a layout module to create layout objects, a letter module to create letter objects, a rule module to create rule objects, and a portfolio module to create portfolio objects. Each of these types represents a task, however they also each represent a type of file, document, or other object that a user may use or author.

In the case of applications dealing with multiple object types, the traditional menu-based MRU system is cumbersome, to say the least. Additionally, the traditional task-based UI either takes up too much screen real estate to be usable (e.g., having a set of icons representing each set of tasks you might want to perform per document type) or non-intuitive tasks are combined together (e.g., to reduce the number of icons). For example, while Cover Flow is convenient for user interfaces that only require navigation of media files (i.e. only of files that may be considered the same type), it would become difficult to use with files of diverse file types (e.g., files that cannot be merely rendered with a media player).

SUMMARY

According to an aspect of the invention, a computing device includes a processor executing instructions to provide a graphical user interface displayed on a display device and for facilitating navigation through a collection of files stored in a storage device, the user interface including a primary icon displayed on the display device and representing a selected file, a temporal axis defined across at least a portion of the primary icon, and one or more secondary icons displayed on the display device, each representing a respective additional file, the secondary icons being positioned separate from the primary icon, wherein the secondary icons are arranged along the temporal axis in temporal order of each additional file represented by the secondary icons.

According to an aspect of the invention, a computer-implemented method includes displaying on a display device a primary icon representing a selected object, displaying on the display device on a sequential axis one or more secondary icons, each secondary icon representing a respective additional object, the secondary icons being positioned separate from the primary icon, allowing a user to select with an input device one of the primary or secondary icons, performing with a computing device a function on the object associated with the primary icon in the case the user selects the primary icon, and transitioning with the computing device the primary icon and secondary icons to make the selected secondary icon the primary icon in the case the user selects one of the secondary icons.

Figure 1:
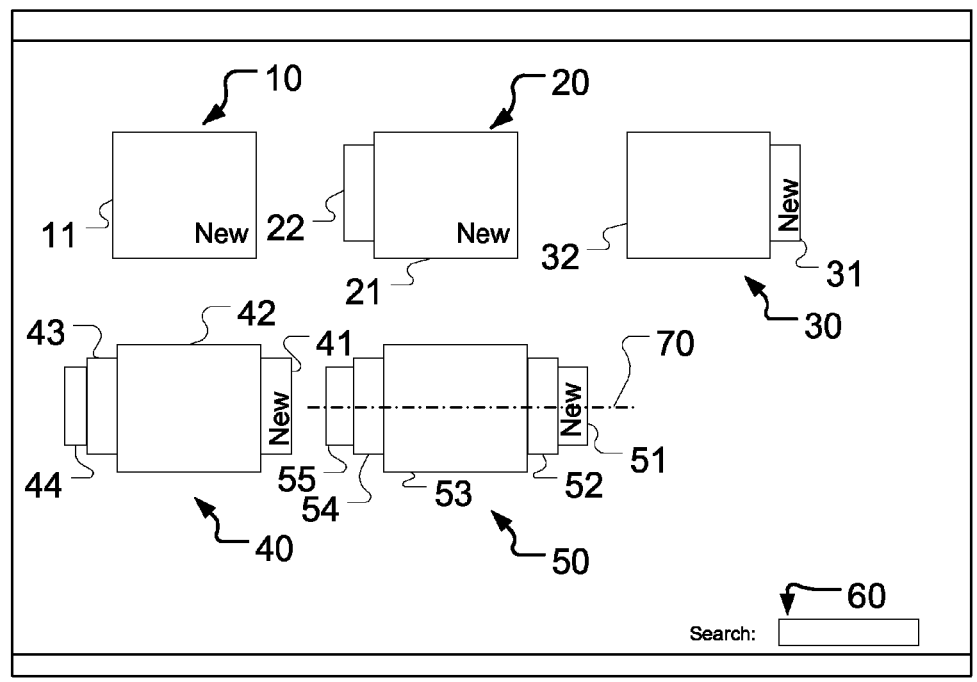
FIG. 1 illustrates an example of a UI display of a task screen including one or more widgets.

While the user interface and method is described herein by way of example and embodiments, those skilled in the art will recognize that the user interface and method is not limited to the embodiments or drawings described. It should be understood that the drawings and description are not intended to limit embodiments to the particular form disclosed. Rather, the intention is to cover all modifications, equivalents and alternatives falling within the spirit and scope of the invention defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the present invention include a UI and method for facilitating navigation of icons to perform a function (e.g., view or edit) with respect to recently used objects associated with the icons. The icons may be configured along a sequential axis to allow a user to easily identify the task or object associated with each icon. The icons arranged along the sequential axis may be arranged temporally according to a critical date of an associated object. The critical date may be, for example, the object create date, the object last viewed date, the object last edited date, the object last run date, the object deleted date, a user defined date, or any other date. While embodiments disclosed herein often refer to most recently used ("MRU") objects, it is understood that "used" can refer to any critical date criteria and is not limited to the preceding examples. Alternatively, sequences of icons may be arranged by other sequential values, such as version numbers, document identification numbers, or priority numbers. Additionally, in a multi-user environment, icons may be organized temporally with regard to a specific user's use or with regard to all users' use.

The sequential axis may be a linear axis defined across at least a portion of a primary icon and may have one or more secondary icons arranged in a sequential order along the axis in relation to the primary icon and positioned separate from the primary icon. For example, the sequential order may be a temporal order (i.e., time-based order) having the icons arranged by a critical date. In embodiments where the axis is a horizontal axis defined across at least a portion of the primary icon and the sequential order is a temporal order, secondary icons may be arranged along the horizontal axis to the sides of the primary icon. In other words, secondary icons representing objects with a critical date (e.g., a date of creation) before the critical date of the object represented by the primary icon may be arranged in temporal order to the left of the primary icon. In similar fashion, secondary icons representing objects having a critical date after the critical date of the object represented by the primary icon may be arranged in temporal order to the right of the primary icon.

Figure 4A:
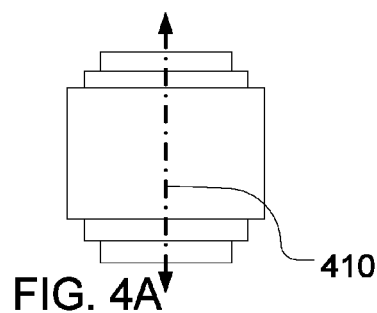
FIG. 4A illustrates an example of a UI display of a widget having a vertical sequential axis.
Figure 4B:
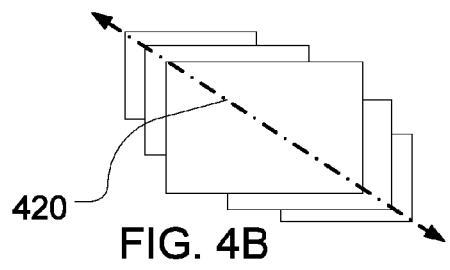
FIG. 4B illustrates an example of a UI display of a widget having a diagonal sequential axis.
Figure 4C:
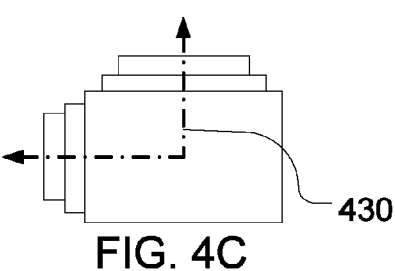
FIG. 4C illustrates an example of a UI display of a widget having sequential axis having a rigid bend.
Figure 4D:
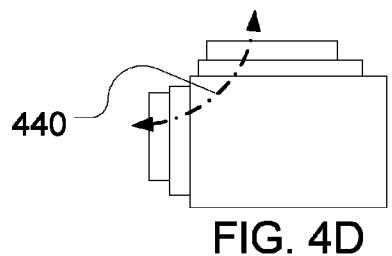
FIG. 4D illustrates an example of a UI display of a widget having a sequential axis having an arc form.
Figure 4E:
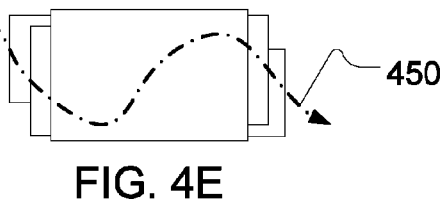
FIG. 4E illustrates an example of a UI display of a widget having a sequential axis having a serpentine form.
Figure 4F:
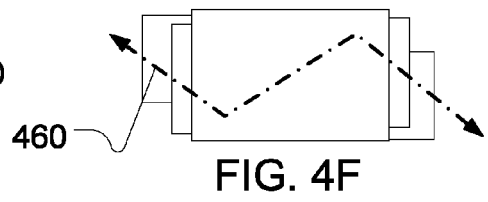
FIG. 4F illustrates an example of a UI display of a widget having a sequential axis in the form of a jagged line.
Figure 4G:
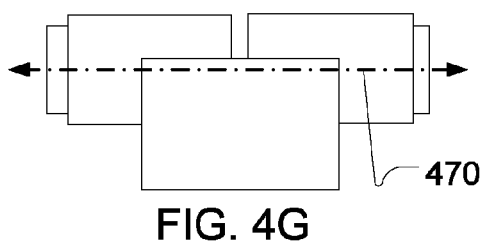
FIG. 4G illustrates an example of a UI display of a widget having a sequential axis crossing only a portion of the primary icon.
Figure 4H:
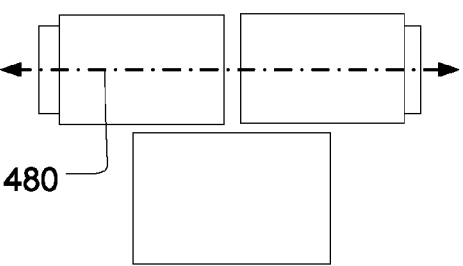
FIG. 4H illustrates an example of a UI display of a widget having a sequential axis crossing the proximity of the primary icon.

Of course, temporal order may be alternatively be from right-to-left. Such embodiments may be advantageous in implementations where flow is customarily from right-to-left, such as Arabic systems. Also, the invention may arrange icons along the axis in alternative sequences, such as reverse temporal order for example. In still other embodiments, a sequential axis may be arranged in other directions, for example a top to bottom axis 410 (FIG. 4A), a top-left to bottom-right axis 420 (FIG. 4B), or in any other linear direction. In still other embodiments, the sequential axis may not be linear. For example, the axis could be a sequential axis having a rigid bend 430 (FIG. 4C), may be an arcing axis 440 (FIG. 4D), may be a serpentine axis 450 (FIG. 4E), may be a jagged axis 460 having a series of rigid bends (FIG. 4F), or may take any other form. Additionally, while an embodiment includes a sequential axis crossing a central portion of a primary icon, alternative embodiments may include a sequential axis 470 crossing only a portion of the primary icon (FIG. 4G), or a sequential axis 480 only crossing the proximity of the primary icon (FIG. 4H). It is understood that the axes shown in FIGS. 4A-4G are merely for illustrative purposes and not part of the UI.

Each MRU icon may display images or information to allow a user to easily identify the object represented by the icon. For example, an MRU icon may display the filename of an associated file and the date and time the file was last viewed. By way of alternative example, an MRU icon may display a screenshot of the MRU object to allow a user to easily identify the MRU object. Such a screenshot may be a thumbnail view of the object, an enlarged portion of the object, or any other display to assist a user in quickly identifying the object. In some embodiments, the primary icon may display a screenshot of the object while secondary icons may include brief information for identifying an object.

The UI facilitates user creation of a new object of a specific type. By way of example, a user may create a new text object (e.g., a document file) by selecting (e.g., clicking with a mouse pointer) a "new" icon (i.e., an icon associated with the task of creating a new object). Upon a user selecting the new icon, the UI may simply create a new object and associate it with an icon. Alternatively, the UI may display an editor (e.g., a word processor) to allow the user to author and edit text in the text object.

New icons may be configured to allow a user to intuitively understand that selecting the icon will create a new object of a specific type. By way of example only, a new icon may simply be labeled "New . . . " if it is clearly recognizable to a user the type of object to be created (e.g., by being labeled or stylized or being arranged with icons associated with a specific object type). By way of alternative example, a new icon may appear as a blank object of a specific type.

The UI allows a user to easily navigate, view, edit, or perform other tasks or functions on recently used objects. A user may access (e.g., open to view or edit) the object associated with the primary icon by simply selecting the primary icon (e.g., clicking on it with a mouse pointer). Additionally, in response to a user selection of a secondary icon, the object associated with the selected secondary icon may become the object associated with the primary icon and the secondary icons may become associated with objects to maintain the sequential ordering of the sequential axis. A user may then access the object represented by the primary icon by selecting it or navigate further in a sequential "direction" by selecting another secondary icon.

The primary icon may be accentuated with respect to secondary icons. The primary icon may, for example, be larger than the secondary icons, be a different color or shade than secondary icons, have an appearance of being in front of secondary icons, or have any other distinguishing characteristic. Additionally, the primary icon may always maintain the same position, for example a centered position.

It should be noted that a UI according to embodiments of the present invention may be implemented with any type of software executed on any hardware device(s) and may be embodied in a pre-programmed general purpose computing device. For example, the UI may be implemented using a server, a personal computer, a portable computer, a thin client, mobile device (e.g., cell phone, smart phone, IPOD™, etc.) or any suitable device or devices. The UI may be displayed on a viewing device, for example, a screen or projected display. A user may interact with the UI via an input device, for example a mouse, keyboard, or touch-screen.

Figure 5:
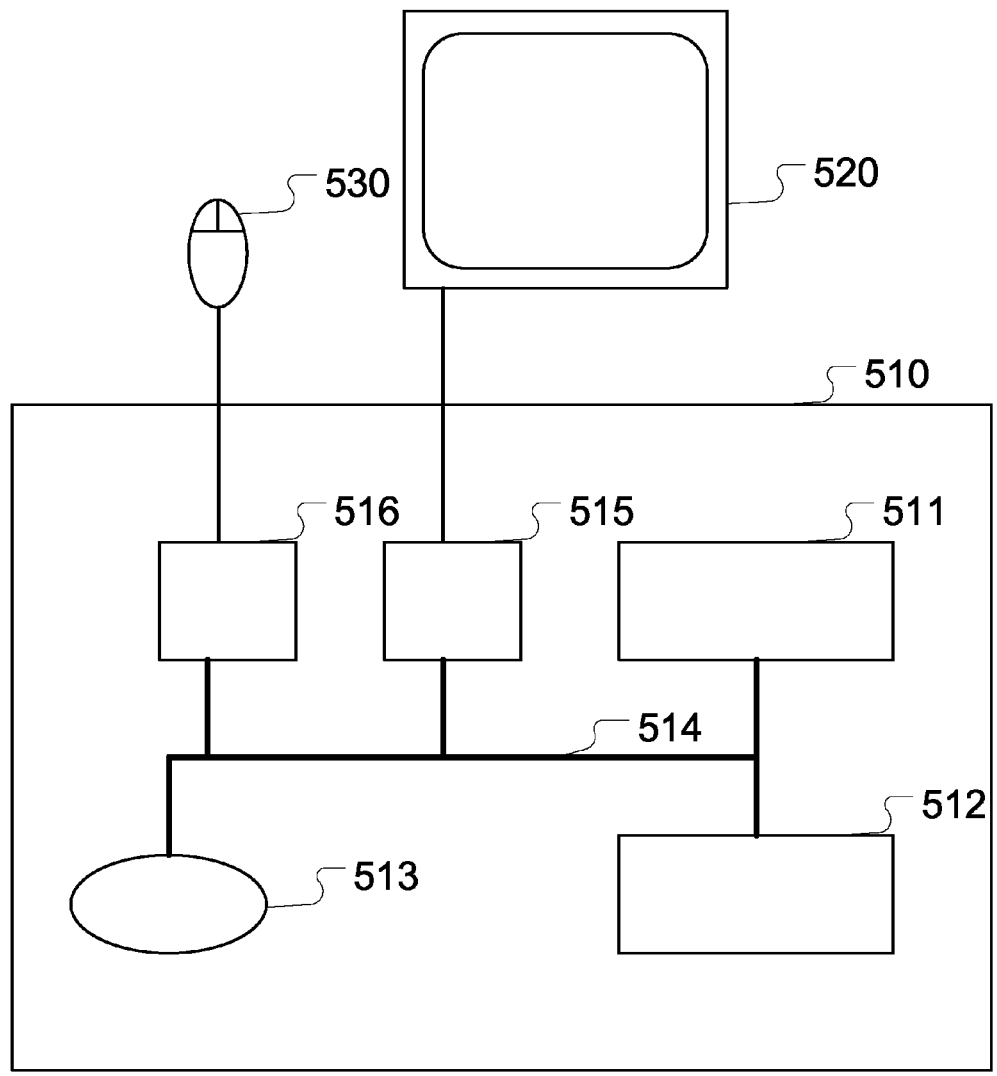
FIG. 5 illustrates a computing device for providing a graphical user interface displayed on a display device and for facilitating navigation through a collection of objects stored on a storage device.

A UI according to this invention may be implemented with software executed on computing device 510 of FIG. 5. Computing device 510 has one or more processors 511 designed to process instructions, for example computer readable instructions stored on a storage device 513. By processing instructions, processors 511 transforms underlying objects such as the objects associated with icons displayed on the UI. Storage device 513 may be any type of storage device (e.g., such an optical storage device, a magnetic storage device, a solid state storage device, etc.). Alternatively, instructions may be stored in remote storage devices, for example storage devices accessed over a network or the Internet. Computing device 510 additionally has memory 512, an input controller 516, and an output controller 515. A bus 514 operatively connects components of computing device 510, including processor 511, memory 512, storage device 513, input controller 516, output controller 515, and any other devices (e.g., network controllers, sound controllers, etc.). Display controller 515 is operatively coupled (e.g., via a wired or wireless connection) to a display device 520 (e.g., a monitor, television, mobile device screen, etc.) in such a fashion that display controller 515 can transform the display on display device 520 (e.g., in response to modules executed). Input controller 516 is operatively coupled (e.g., via a wired or wireless connection) to input device 530 (e.g., mouse, keyboard, touch-pad, scroll-ball, etc.) in such a fashion that input can be received from a user (e.g., a user may select with input device 530 icons in the UI displayed on display device 520). Computing device 510, display device 520, and input device 530 may be separate devices (e.g., a personal computer connected by wires to a monitor and mouse), may be integrated in a single device (e.g., a mobile device with a touch-screen), or any combination of devices (e.g., a computing device operatively coupled to a touch-screen display device, a plurality of computing devices attached to a single display device and input device, etc.).

FIG. 1 illustrates an example of UI task screen 100. Task screen 100 includes one or more widgets (i.e., elements that display information arrangements). Each widget can correspond to an object type. By way of non-limiting example, task screen 100 may include a text widget 10, an image widget 20, a letter widget 30, a layout widget 40, and a portfolio widget 50. Each widget may be an arrangement of icons. Each icon may be associated with (i.e., represent) a task (e.g., creating a text object or opening an existing text object) as well as an object of a specific type (e.g., a document). If objects of the widget type have previously been created, each widget may display icons representing MRU objects to allow a user to quickly and easily access recently used objects of that widget type.

Each widget (e.g., portfolio widget 50) may include a primary icon (e.g., icon 53). The primary icon is accentuated to allow a user to easily and quickly recognize it as the primary icon. The embodiment illustrated in FIG. 1 shows primary icons having a greater size than secondary icons, arranged centrally within each widget, and partially overlapping secondary icons. In alternative embodiments, the primary icon may be of another size that differentiates it from the secondary icon, for example the primary icon could be smaller than the secondary icons, could be taller and thinner than the secondary icons, could be shorter and fatter than the secondary icons, or have any other size or dimensional differentiation characteristic. Alternatively, the primary icon may be the same size but other visual indicia may allow a user to identify the primary icon, for example the display on the icon, the color of the icon, the shape of the icon, or other visual effects (e.g., 3D effects).

Each widget in the illustrated embodiment includes icons arranged separate from the primary icon along a horizontal sequential axis defined across a central portion of the primary icon and defined by the secondary icons described below. Of course, while the secondary icons are separate from the primary icon, this includes arrangements where the secondary icons are in proximity to the primary icon and contact or are partially overlapped by the primary icon as shown in FIG. 1. Dotted line 70 in FIG. 1 illustrates the horizontal sequential axis. It is understood that line 70 is included in FIG. 1 merely to illustrate to a reader the horizontal temporal axis and is not part of the UI. In embodiments having a temporal axis arranged according to a last-viewed date with the most recently viewed objects rightmost and the least recently viewed objects leftmost, the icons may be arranged according to a last-viewed date of the object associated with each icon. For example, portfolio widget 50 may have the most recently viewed portfolio associated with icon 52, the second most recently viewed portfolio associated with icon 53, the third most recently used portfolio associated with icon 54, and the fourth most recently used portfolio associated with icon 55. According to embodiments of the invention, a widget may display less icons if less objects exist. For example, if only a single letter has been viewed, letter widget 30 may display only a single icon 32 associated with the most recently viewed letter.

Arranging MRU icons in this fashion allows users to see how many recently used objects exist. For example, by glancing at task screen 100, a user can instantly deduce from text widget 10 that no text objects have been created because text widget 10 shows no MRU icons. Similarly, a user can instantly see that a single image object and a single letter object exist because each respective widget shows a single MRU icon.

According to this example, each widget includes a "new" icon configured to perform the task of creating a new object of a specific type. For example, by selecting "new" icon 11, a new text object may be created. If no objects of a specific type exist, a "new" icon may be the only icon in a widget (e.g., "new" icon 11 is the only icon in text widget 10 because no text objects may exist). Additionally, because logically a new object will be the most recently viewed when created, widgets having recently used objects may arrange a "new" icon at an end of the sequential axis. For example, "new" icon 51 associated with the task of creating a new portfolio may be arranged in the right-most position of portfolio widget 50 as shown.

With icons arranged along a temporal axis having the MRU objects arranged in the right-most position, a "new" icon may always be in the right-most position even if a user navigates toward less recently used objects. Alternatively, a "new" icon may be arranged on a temporal axis in the right-most position and may disappear from view when a user navigates in the direction of less recently used objects.

When a user first opens an application having task screen 100, all widgets may have a "new" icon as the primary icon. For example, widgets 10 and 20 appear as they would when the application is first opened. This allows a user to create a new object of any widget type with a single selection. At the same time, because any icons associated with MRU object are visible to the left of the "new" icon, a user may quickly and intuitively navigate to and open recently used objects. After a user finishes authoring or editing an object and exits the respective editor, that object may become the most recently used and an icon associated with that object may become the primary icon. For example, widgets 30 and 40 each show icons representing the MRU object in as the primary icon. Thus, a user can quickly return to editing the object with a single selection.

While the UI illustrated in FIG. 1 shows a maximum of five icons in each widget, the number of icons displayed by each widget may be optimally configured depending on situational factors. For example, a greater number of icons may be shown on a large screen or in the interface to a program that only performs a few types of tasks or uses only a few types of objects. Alternatively, a program that performs a wide range of tasks may only have the available UI real estate (i.e., viewing space) to include widgets displaying fewer icons. Likewise, the size of the icons comprising the widgets may vary depending on situational factors, such as the number of tasks performed by an application and the size of a viewable UI. Still further, the amount of overlap of icons in a widget may vary. In FIG. 1, all but about a quarter of each secondary icon is "overlapped" by another icon. In other embodiments this ratio may vary, for example secondary icons may be three quarters visible, may not be overlapped at all, or may have any desirable ratio of overlap. Greater overlap of icons may allow more widgets to fit on a screen or more icons to comprise each widget. Alternatively, lesser overlap may allow more information to be displayed on each secondary icon, thereby allowing a user to more readily identify or recognize each icon. There may be a direct correlation between the size of the icons comprising the widgets, the number of icons, and the overlap of the icons.

The number of icons, icon size, icon overlap, or other display parameters of a widget may be user selectable. The system or application may automatically select optimal display parameters of a widget based on situational factors. The system may further automatically vary these parameters of a widget as situational factors vary, for example when a user varies the viewable size of the task screen 100.

The arrangement of icons may vary widely while still maintaining benefits of the present invention. In contrast to the widgets illustrated in FIG. 1, the icons comprising a widget may simply be arranged temporally from left to right with the icon representing the most recently used object taking left-most positions. In analogous fashion, icons may be arranged, i.e., the sequential axis can be oriented, vertically, diagonally, or in any other orientation. Still further, icons may be arranged in other alignments, for example along an arc, a serpentine line, a line having one or more bends (e.g., beginning above the primary icon, bending at a right angle, and extending to the right of the primary icon) or a jagged line.

Still further, the arrangement of icons according to alternative embodiments may appear three-dimensional (3D) to a user. For example, portfolio widget 50 shown in FIG. 1 may appear to have primary icon 53 floating in front of the secondary icons 55, 54, 52, and 51. In such an embodiment, secondary icons 52 and 54 may appear recessed behind primary icon 53 and secondary icons 51 and 55 may appear further recessed behind secondary icons 52 and 54. Additional effects or rendering may add to a user's 3D perception of arrangement of icons comprising a widget, for example lighting and/or shading. The invention further contemplates 3D effects utilizing emerging 3D technologies, such as features of 3D display panels and user input devices utilizing 3D control.

Additionally, while the icons of widgets illustrated in FIG. 1 all appear to be oriented along the user's viewing plane, alternative embodiments may include icons that rotate or tilt to both create a pleasant viewing experience to a user and to allow a user to quickly tell the sequential orientation of the icons. Still other visual effects, such as curvature of the icons, coloring of the icons, or changing a user's perceived viewpoint (i.e. changing the camera angle) may be included in other embodiments.

Independent of the orientation or arrangement of the sequence of icons, according to an aspect of the present invention a "new" icon may always be at least partially visible and quickly accessible by a user. In FIG. 1, a "new" icon is always either the primary icon or the secondary icon in the right-most position. Alternatively, a "new" icon may be arranged in a widget in other positions. By way of example only, if icons are arranged temporally from left to right according to a critical date of the object associated with the icon, a "new" icon may extend below the widget along a vertical axis. In still other embodiments, a "new" icon may be smaller than the primary icon and may appear to a user to hover in front of a portion of the primary icon.

The following sets forth how a user may navigate one or more widgets according to an embodiment of the present invention. A user may select the primary icon of the widget to either create a new object of that widget type (if a "new" icon is the primary icon) or perform another task (e.g., view, edit, print, etc.) on an object of that widget type associated with the primary icon (if an icon associated with an object is the primary icon). For example, a user may select "new" icon 11 of text module widget 10 to create a new document or may select primary icon 32 of letter widget 30 to edit the MRU letter. Alternatively, a user may select a secondary icon of a widget to traverse the icons in the direction of the selected icon. By selecting a secondary icon, the icons adjust horizontally to transform the selected icon from a secondary icon to the primary icon (i.e., transform the object associated with the selected secondary icon to the object associated with the primary icon). A user may then select the primary icon to either create a new object of that widget type (if a "new" icon is now the primary icon) or perform another task or function (e.g., view, edit, print, run, delete, etc.) on an object of that widget type associated with the primary icon (if an icon associated with an object is the primary icon). Scrolling, selection, and other UI navigation can be accomplished with any known input device, such as a mouse, touchpad, touchscreen, digitizer, scroll wheel, keyboard, and the like.

As the icons of a widget are transformed (i.e., rearranged) to make the selected secondary icon the primary icon, the widget maintains the sequential arrangement of the icons. In other words, selecting a secondary icon brings that secondary icon to the primary icon position and rearranges the secondary icons to maintain the sequential arrangement. According to some embodiments, at all times a "new" icon may remain oriented immediately to the right of icon representing the most recently used object. A user may continue to select secondary icons to further traverse the icons in a widget (i.e. to navigate to icons associated with less recently used objects).

As a user traverses the icons of a widget, the icons may move horizontally across the widget. When a user initiates navigation toward icons associated with less recently used objects, icons associated with less recently used objects, to the extent they exist, may appear in the left-most positions of the widget and all other icons move to the right enough positions to allow the selected secondary icon to take the position of primary icon. If there are not enough positions for all secondary icons to be displayed to the right of the primary icon, icons associated with more recently used objects may no longer be displayed in the widget. For example by selecting secondary icon 55 in portfolio widget 50, secondary icon 55 becomes the primary icon and two icons associated with less recently used portfolios display to the left of now primary icon 55. In like fashion, secondary icon 54 moves into the position of secondary icon 52 and secondary icons 53 and 52 disappear from view. "New" icon 51, however, may always be displayed. FIGS. 2A through 2J show exemplary navigation by a user of icons of a widget in more detail according to some embodiments.

Figure 2A:
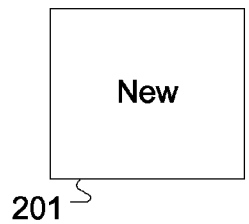
FIG. 2A illustrates an example of a UI display of a widget in its initial state.
Figure 2B:
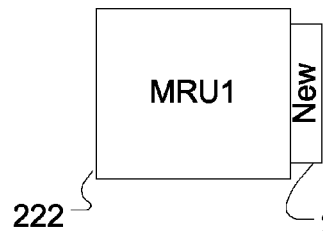
FIG. 2B illustrates an example of a UI display of a widget displaying the MRU icon.

FIG. 2A illustrates an exemplary UI display of a widget in its initial state. In FIG. 2A, the icons comprising the widget include only a single icon 201 labeled "New". To create a new object of the widget type, a user selects "new" icon 201, for example by clicking on it with a mouse pointer. By selecting "new" icon 201, the UI may display an editor to allow the user to modify the new object, such as by authoring and editing text in a text object. The editor may partially or totally obstruct (i.e., hide from the user's view) one or more widgets, for example widgets 10-50 illustrated on task screen 100 of FIG. 1. Alternatively, selecting "new" icon 201 may create an icon associated with a new object (e.g., an empty text object) that may then be selected and opened from the widget.

After working with the text object, the user who was authoring a text object may decide to start working on a letter. The user may then save the changes to the text object in conventional fashion and exits the editor. The text widget may then appear as in FIG. 2B, having two icons, "new" icon 221 and an icon 222 representing the MRU text object, because the new text object is now the MRU text object. Icon 222 representing the MRU object is the primary icon to allow a user to quickly edit the recently exited text object.

Because no letters exist, a letter widget appears the same as the widget shown in FIG. 2A. The user selects "new" icon 201 to create a new letter object. The UI may display an editor to allow the user to modify the new letter object. While editing the new letter object, the user may realize that they need to further edit the text object they previously created. The user may then exit the letter editor to go back to a task screen. As discussed with reference to FIG. 1 above, when a user exits an editor, one or more widgets of different types (e.g., widgets 10, 20, 30, 40 and 50) may be displayed to the user on a task screen (e.g., task screen 100). The letter widget now looks like FIG. 2B, having two icons, because one letter object exists. Again, the icon representing the MRU letter object is the primary icon to allow a user to edit the letter object with a single click.

At this point, the user needs only to select primary icon 222 of the text widget to continue editing the MRU text object. The user may switch back to editing the letter object just as easily. Because the widget arranges the icon associated with the MRU object as the primary icon, a user may easily transition from editing one object type to editing another.

Figure 2C:
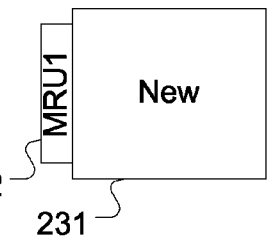
FIG. 2C illustrates an example of a alternative UI display of a widget displaying the MRU icon.

FIG. 2C shows the a widget's initial appearance when an object already exists (a widget having two icons, "new" icon 231 being the primary icon and an icon 231 associated with the MRU object being a secondary icon arranged to the left of "new" icon 231 according to a temporal sequencing). A widget may have this initial appearance after a user launches or logs into the application (i.e., prior to editing a new or existing object which that widget pertains to).

Figure 2D:
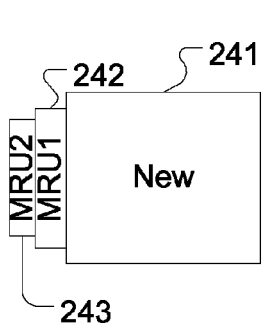
FIG. 2D illustrates an example of a UI display of a widget displaying the two MRU icons.

Similarly, FIG. 2D shows the initial view of a widget having two existing objects. While the widget comprises three icons, "new" icon 241 remains the primary icon while MRU1 icon 242 and MRU2 icon 243 extend to the left of "new" icon 241. According to an embodiment of the present invention having a maximum of two secondary icons extending from either side of the primary icon, FIG. 2D represents the initial appearance of a widget of any object type where more than two objects of that type have been previously used. The following explains how a user may navigate from the widget shown in FIG. 2D to view and access less recently used objects.

Figure 2E:
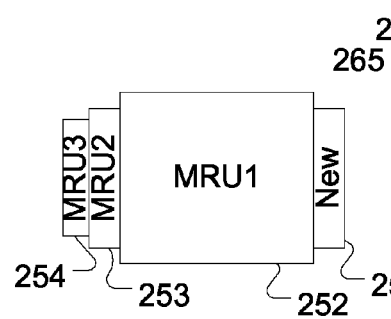
FIG. 2E illustrates an example of a UI display of a widget displaying the three MRU icons.

If a user selects MRU1 icon 242, the icons of the widget transform to bring the MRU1 icon 242 into the primary icon position and the secondary icons are transformed to maintain temporal sequencing. FIG. 2E shows the view of a widget after selecting MRU1 icon 242 which was partially hidden behind "new" icon 241 of FIG. 2D. In FIG. 2E, "new" icon 251 remains in view but transforms to a secondary icon to the right of the primary icon. According to an aspect of the present invention, this provides an intuitive temporal arrangement because new objects are in the future and the historical order of objects puts the oldest objects on the left-hand side of "new" icon 251.

Figure 2F:
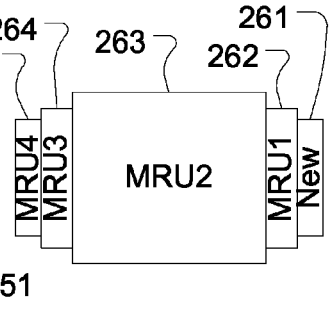
FIG. 2F illustrates an example of a UI display of a widget displaying the four MRU icons.

FIG. 2F shows the state of the widget after selecting MRU2 icon 253 of FIG. 2E. "New" icon 261 transitions one position to the right and MRU1 icon 262 transitions one position to the right as well.

Figure 2G:
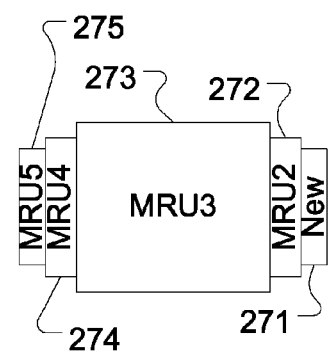
FIG. 2G illustrates an example of a UI display of a widget showing the second through fifth MRU icons.

FIG. 2G illustrates that, according to some exemplary embodiments, a "new" icon, e.g. "new" icon 271, always remains in view even when a user selects MRU3 icon 264 of FIG. 2F (or MRU3 icon 254 from FIG. 2E) and MRU3 icon 273 becomes the primary icon. In this case, the MRU1 icon disappears from view. It would reappear next to "new" icon 271 should the user select secondary icon MRU2 icon 272.

Figure 2H:
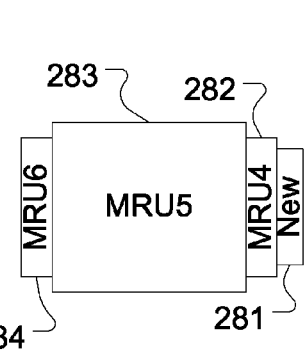
FIG. 2H illustrates an example of a UI display of a widget showing the fourth through sixth MRU icons.

FIG. 2H illustrates that icons to the left of the primary icon disappear when there are no more objects older than those associated with the displayed icons. In this case, MRU6 icon 284 represents the oldest object of the type represented by the widget. Therefore, no left-most icon appears after selecting MRU5 icon 275. FIG. 2H also illustrates that the user is not limited to selecting only the immediately preceding icon but may select any icon, for example the left-most icon (the icon associated with the oldest object currently in view). In this case, icons associated with the next two most recently used objects (or less if there is only one or none) are displayed as secondary icons to the left of the primary icon.

Figure 2I:
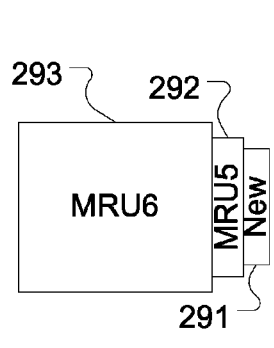
FIG. 2I illustrates an example of a UI display of a widget showing the fifth and sixth MRU icons.

FIG. 2I illustrates the state of the widget after selecting MRU6 icon 284, the icon associated with the oldest object (e.g., the object having the oldest critical date). The widget displays no icons to the left of the primary icon and MRU5 icon 292 is now on the right. "New" icon 291 may still remain in the right-most position.

Thus, the sequential flow of icons representing objects progresses from left to right as a user navigates toward less recently used objects with a "new" icon always remaining visible. As described above, the primary icon of the widget may show a preview of the associated object's contents. When an icon associated with an object is the primary icon, selecting the icon, for example by clicking on it, performs a function on the associated object (e.g., opening it for viewing or editing, printing, deleting, etc.). In similar fashion, a user may navigate toward more recently used objects.

Alternatively, selecting the primary icon may perform other functions relating to that object. A user may be able to directly perform a function (e.g., open an object for editing) on an object associated with a secondary icon, for example by performing a special selection, such as double-clicking, holding a keyboard key while clicking, or pressing a keyboard shortcut combination.

Also, a user may drag-and-drop icons in a widget to navigate a widget. For example, a user may click on an icon associated with a recently used object and drag the icon to the right to view icons associated with less recently used objects or may drag the icon to the left to view icons associated with more recently used objects. The speed with which a user drags-and-drops icons may determine how far the widget traverses recently used objects.

A widget may have an associated search function to allow a user to directly navigate the icons of a widget to search for an object. For example, task screen 100 of FIG. 1 shows a search box 60 configured to allow a user to directly search for an object associated with an icon of a widget. A user interface may have a search box 60 for each widget configured to search objects associated with icons of that widget or may include a search box 60 for searching objects associated with icons of a plurality of widgets. Additionally, search box 60 may allow a user to search by various attributes of an object, such as the objects name, type, last used date, or any other search parameter.

A user's rights or permissions may determine one or more attributes of the icons of a widget. By way of example, in a system having multiple users, a user may not see icons associated with objects that the user does not have certain rights to. Alternatively, icons associated with objects a user does not have certain rights to may show some indicia of the user's rights, such as an icon may have a specific color or tint if the user of the widget has read-only rights, has all rights except deletion, or any other rights scenario. In still other embodiments, a "new" icon may be displayed only to a user whose permission allow creation of a new object of the widget type.

Figure 3:
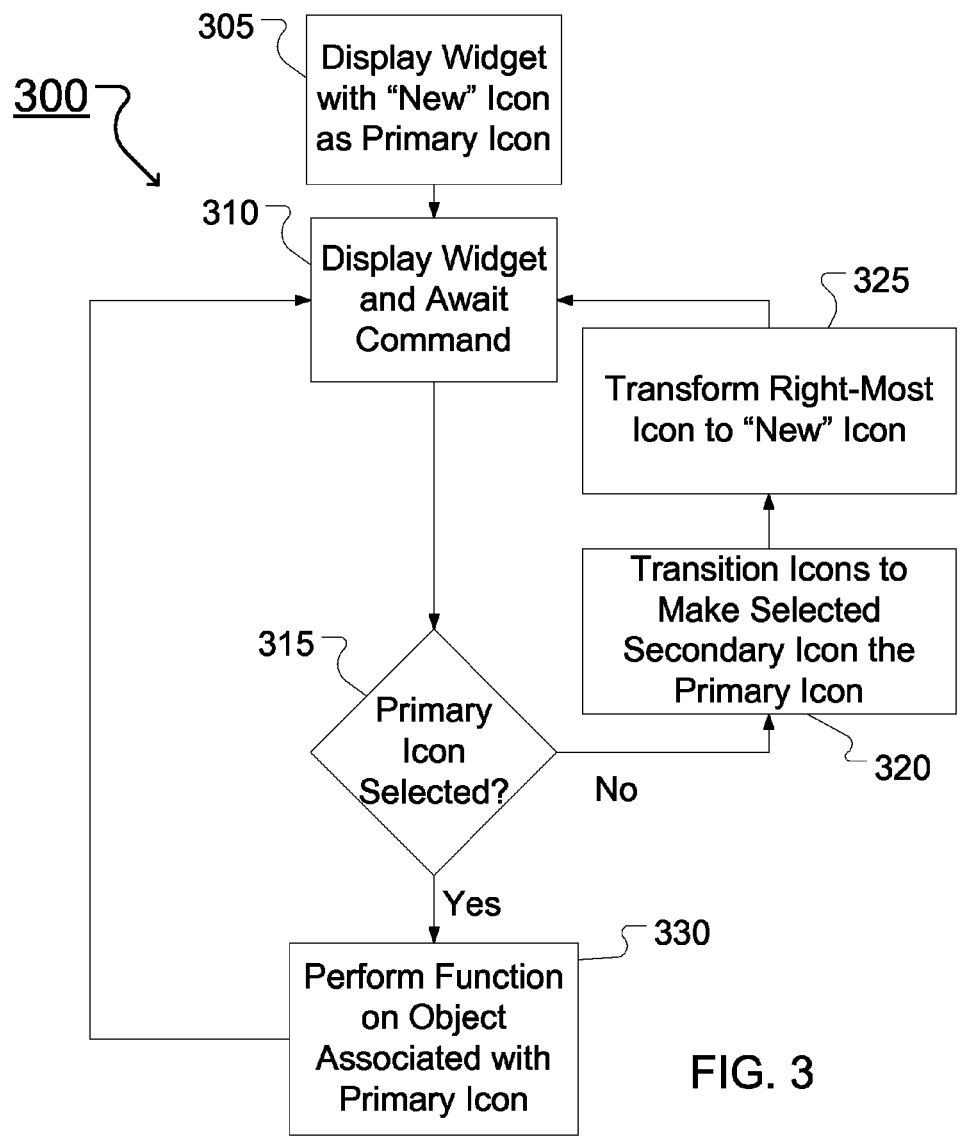
FIG. 3 illustrates an example of a flowchart of an example method of navigation of recently used objects.

Referring now to FIG. 3, flowchart 300 shows how a computer-implemented method may facilitate navigation of recently used objects. In step 305, when an application is first opened or logged into, a display device displays a widget having a "new" icon as the primary icon. At step 310, the widget remains displayed on the display device and awaits a user command received from a user input device, for example selection of the primary icon or of a secondary icon with a mouse. When a user command is received, at step 315 a computing device determines if the primary icon was selected or if a secondary icon was selected. If the primary icon was selected, the flowchart proceeds to step 330 and a function is performed on the object associated with the primary icon. For example, if the object associated with the primary icon is a text file, the file may be opened with an editor to allow the user to edit the file. In this case the flowchart may remain at step 330 until the user exits the editor, at which point the computing device would return the process to step 310 and await a further user command. Alternatively, a computing device may perform a function, such as printing the object associated with the primary icon, and return to step 310. If a secondary icon is selected at step 315, the flowchart proceeds to step 320 and the computing device transitions icons to transform the selected secondary icon into the primary icon (i.e. the object associated with the selected secondary icon becomes the object associated with the primary icon). After step 320, at step 330 a computing device transforms the right-most icon to a "new" icon. The flowchart then returns to step 310 and awaits further commands from a user.

Other embodiments of the present invention may include a non-transitory computer readable storage device having computer readable instructions (e.g., code) stored therein configured to be processed by a processor to provide a user interface to a user according to embodiments of the present invention.

Of course the sequential axis is not limited to organizing objects in temporal order according to a critical date. Alternative embodiments provide logical sequencing of objects to beneficially allow a user to quickly and intuitively access objects in a task based UI. By way of example only, a widget may display objects in alphabetical order by file name. Similarly, embodiments of the present invention are not limited to widgets each pertaining to a different object type. Alternative embodiments may include a plurality of widgets pertaining to the same file type but having some other differentiating factor. For example, two widgets may both relate to document objects, but one may comprise documents related to a first project while the other may comprise documents relating to a second project. Alternatively, a widget may arrange objects of different types along a sequential axis according to the object type. Still other embodiments may organize objects according to size (e.g., file size in bytes, kilobytes, megabytes, terabytes, etc.), court (e.g., character count, word count, line count, paragraph count, page count, section count, etc.), the number of vertices (e.g., a 2D or 3D file), the number of notes (e.g., for a MIDI file), or the progression of primary key signatures (e.g., for a music file).

Alternative embodiments include multiple intermediate task-based screens in order to finally arrive at what the user wants to accomplish. In other words, the object associated with each icon of a widget may be an additional widget. This approach allows for tiered navigation of objects and may conserve screen real estate. At the same time, this approach may inconvenience a user by requiring navigation between at least two widgets. In still other embodiments, a task screen, such as task screen 100 shown in FIG. 1, may be associated with each icon. This approach allows for tiered navigation of an even greater number of objects. Of course still other embodiments may have icons associated with a mixture of objects, such as having one or more icons associated with widgets, one or more icons associated with task screens, and one or more icons associated with other objects.

The above disclosure generally refers to "objects" represented by the icons. One of ordinary skill in the art will understand an object may be a file, application, operating system, database, database entry, or any other module that may be associated by an icon. The objects are stored on media in a non-transitory manner. Additionally, a file may be an application stored on media in a non-transitory manner.

The invention has been described through embodiments. However, various modifications can be made without departing from the scope of the invention as defined by the appended claims and legal equivalents.

What is claimed is:

1. A method comprising:
   presenting, by a processor, at least one creation icon in a graphical interface, the at least one creation icon associated with creating a new object for at least one application associated with the graphical interface;

responsive to receiving a first input to the at least one creation icon, generating, by the processor, a first object in a first application;

generating, by the processor, a first icon representing the first object, wherein the first icon is associated with at least one function of the first application;

responsive to receiving a second input to the at least one creation icon, generating, by the processor, a second object in a second application, wherein the second application includes different functionality than the first application;

generating, by the processor, a second icon representing the second object, wherein the second icon is associated with at least one function of the second application; and presenting, by the processor, the at least one creation icon, the first icon, and the second icon in a sequential order along a sequential axis in the graphical interface, wherein the first icon and the second icon are presented based on the first object and the second object being generated responsive to the first input and the second input to the at least one creation icon.

2. The method of claim 1, wherein presenting the at least one creation icon, the first icon, and the second icon in the sequential order comprises presenting the first icon and the second icon in a temporal order.

3. The method of claim 2, wherein presenting the at least one creation icon, the first icon, and the second icon in the temporal order comprises at least one of:

generating the temporal order based on a respective date when respective content from each of the first object and the second object were last rendered for display; or generating the temporal order based on a respective date on which at least one of the first object and the second object was deleted.

4. The method of claim 2, further comprising:

identifying one of the first icon and the second icon as a primary icon in response to receiving input to the graphical interface selecting the one of the first icon and the second icon;

identifying another of the first icon and the second icon as a secondary icon based on the other of the first icon and the second icon being identified as the primary icon; and modifying the primary icon to include temporal information describing the one of the first object and the second object that is associated with the primary icon.

5. The method of claim 1, wherein presenting the at least one creation icon, the first icon, and the second icon in the sequential order comprises:

identifying a display language associated with the graphical interface;

generating the temporal order based at least partially on the display language.

6. The method of claim 1, wherein presenting the at least one creation icon, the first icon, and the second icon in the sequential order comprises at least one of:

generating the sequential order based on a respective file name for each of the first object and the second object;

generating the sequential order based on a respective file size for each of the first object and the second object; or generating the sequential order based on a respective number of content items in each of the first object and the second object.

7. The method of claim 1, further comprising:

identifying one of the first icon and the second icon as a primary icon in response to receiving input to the graphical interface selecting the one of the first icon and the second icon;

identifying another of the first icon and the second icon as a secondary icon based on the other of the first icon and the second icon being identified as the primary icon; and modifying the primary icon to include at least some content of the one of the first object and the second object that is represented by the primary icon.

8. The method of claim 1, further comprising:

identifying one of the first icon and the second icon as a primary icon in response to receiving input to the graphical interface selecting the one of the first icon and the second icon;

identifying one of the first icon and the second icon as a secondary icon based on the other of the first icon and the second icon being identified as the primary icon; and generating a visual indicator in the graphical interface identifying the primary icon by performing at least one of modifying a color of the primary icon or rendering the primary icon with a three-dimensional effect.

9. The method of claim 1, further comprising:

identifying one of the first icon and the second icon as a primary icon in response to receiving input to the graphical interface selecting the one of the first icon and the second icon;

identifying one of the first icon and the second icon as a secondary icon based on the other of the first icon and the second icon being identified as the primary icon; and generating a visual indicator in the graphical interface identifying the primary icon by rendering the primary icon with a three-dimensional effect.

10. The method of claim 1, further comprising positioning the at least one creation icon to be at an edge of the graphical interface.

11. The method of claim 1, wherein generating the first icon is performed subsequent to closing the first application and generating the second icon is performed subsequent to closing the second application.

12. The method of claim 1, wherein the at least one creation icon comprises a first creation icon associated with the first application and a second creation icon associated with the second application, wherein the first input is received to the first creation icon and the second input is received to the second creation icon.

13. The method of claim 1, further comprising determining, prior to presenting the at least one creation icon, that the graphical interface is being accessed via an account authorized to create new objects via at least one of the first application or the second application.

14. A non-transitory computer-readable medium embodying program code executable by a processing device, the non-transitory computer-readable medium comprising:

program code for presenting at least one creation icon in a graphical interface, the at least one creation icon associated with creating a new object for at least one application associated with the graphical interface;

program code for generating a first object in a first application responsive to receiving a first input to the at least one creation icon;

program code for generating a first icon representing the first object, wherein the first icon is associated with at least one function of the first application;

program code for generating a second object in a second application responsive to receiving a second input to the at least one creation icon, wherein the second application includes different functionality than the first application;

program code for generating a second icon representing the second object, wherein the second icon is associated with at least one function of the second application; and program code for presenting the at least one creation icon, the first icon, and the second icon in a sequential order along a sequential axis in the graphical interface, wherein the first icon and the second icon are presented based on the first object and the second object being generated responsive to the first input and the second input to the at least one creation icon.

15. The non-transitory computer-readable medium of claim 14, wherein presenting the at least one creation icon, the first icon, and the second icon in the sequential order comprises presenting the first icon and the second icon in a temporal order.

16. The non-transitory computer-readable medium of claim 15, program code for identifying one of the first icon and the second icon as a primary icon in response to receiving input to the graphical interface selecting the one of the first icon and the second icon;

program code for identifying another of the first icon and the second icon as a secondary icon based on the other of the first icon and the second icon being identified as the primary icon; and program code for modifying the primary icon to include temporal information describing the one of the first object and the second object that is associated with the primary icon.

17. The non-transitory computer-readable medium of claim 14, wherein presenting the at least one creation icon, the first icon, and the second icon in the sequential order comprises at least one of:

generating the sequential order based on a respective file name for each of the first object and the second object;

generating the sequential order based on a respective file size for each of the first object and the second object; or generating the sequential order based on a respective number of content items in each of the first object and the second object.

18. A method comprising:

presenting, by a processor, a first creation icon and a second creation icon in a graphical interface, wherein the first creation icon is associated with creating new objects for a first application associated with the graphical interface and the second creation icon is associated with creating new objects for a second application associated with the graphical interface;

generating, by the processor, a first plurality of objects in the first application in response to receiving a first plurality of inputs to the first creation icon;

generating, by the processor, a second plurality of objects in the second application in response to receiving a second plurality of inputs to the second creation icon; and presenting, by the processor, the first creation icon grouped with a first plurality of icons representing the first plurality of objects in a first sequential order and the second creation icon grouped with the second plurality of icons representing the second plurality of objects in a second sequential order, wherein each of the first plurality of icons and each of the second plurality of icons are positioned along a common sequential axis, wherein the first plurality of icons and the second plurality of icons are presented based on the first plurality of objects being generated responsive to the first plurality of inputs to the first creation icon and the second plurality of objects being generated responsive to the second plurality of inputs to the second creation icon.

19. The method of claim 18, wherein the first creation icon is positioned along a first additional axis intersecting to the common sequential axis and the second creation icon is positioned along a second additional axis intersecting the common sequential axis.

20. The method of claim 18, wherein at least some icons of the first plurality of icons and the second plurality of icons represent objects stored in different directories than at least some other icons of the first plurality of icons and the second plurality of icons.

21. The method of claim 18, wherein presenting the first plurality of icons in the first sequential order and presenting the second plurality of objects in the second sequential order comprises presenting the first plurality of icons and the second plurality of icons in a temporal order.

22. The method of claim 21, wherein presenting the first plurality of icons and the second plurality of icons in the temporal order comprises at least one of:

generating the temporal order based on a respective date when respective content from each of the first plurality of objects and the second plurality of objects were last rendered for display; or generating the temporal order based on a respective date on which at least one of the first plurality of objects or the second plurality of objects was deleted.

23. The method of claim 18, wherein presenting the first plurality of icons in the first sequential order and presenting the second plurality of objects in the second sequential order comprises at least one of:

generating the first sequential order based on a respective file name for each of the first plurality of objects and generating the second sequential order based on a respective file name for each of the second plurality of objects;

generating the first sequential order based on a respective file size for each of the first plurality of objects and generating the second sequential order based on a respective file size for each of the second plurality of objects; or generating the first sequential order based on a respective number of content items in each of the first plurality of objects and generating the second sequential order based on a respective number of content items in each of the second plurality of objects.

24. A non-transitory computer-readable medium embodying program code executable by a processing device, the non-transitory computer-readable medium comprising:

program code for presenting a first creation icon and a second creation icon in a graphical interface, wherein the first creation icon is associated with creating new objects for a first application associated with the graphical interface and the second creation icon is associated with creating new objects for a second application associated with the graphical interface;

program code for generating a first plurality of objects in the first application in response to receiving a first plurality of inputs to the first creation icon;

program code for generating a second plurality of objects in the second application in response to receiving a second plurality of inputs to the second creation icon; and program code for presenting the first creation icon grouped with a first plurality of icons representing the first plurality of objects in a first sequential order and the second creation icon grouped with the second plurality of icons representing the second plurality of objects in a second sequential order, wherein each of the first plurality of icons and each of the second plurality of icons are positioned along a common sequential axis, wherein the first plurality of icons and the second plurality of icons are presented based on the first plurality of objects being generated responsive to the first plurality of inputs to the first creation icon and the second plurality of objects being generated responsive to the second plurality of inputs to the second creation icon.

25. The non-transitory computer-readable medium of claim 24, wherein the first creation icon is positioned along a first additional axis intersecting to the common sequential axis and the second creation icon is positioned along a second additional axis intersecting the common sequential axis.

26. The non-transitory computer-readable medium of claim 24, wherein at least some icons of the first plurality of icons and the second plurality of icons represent objects stored in different directories than at least some other icons of the first plurality of icons and the second plurality of icons.

27. The non-transitory computer-readable medium of claim 24, wherein presenting the first plurality of icons in the first sequential order and presenting the second plurality of objects in the second sequential order comprises presenting the first plurality of icons and the second plurality of icons in a temporal order.

\* \* \* \* \*

UNITED STATES PATENT AND TRADEMARK OFFICE
CERTIFICATE OF CORRECTION

PATENT NO.       : 8,522,165 B2  
APPLICATION NO.  : 12/818775  
DATED            : August 27, 2013  
INVENTOR(S)      : Stefan Cameron et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 59 days.

Signed and Sealed this
Twenty-fourth Day of June, 2014

Michelle K. Lee
*Deputy Director of the United States Patent and Trademark Office*